United States Patent
Flynn et al.

(10) Patent No.: US 7,611,268 B2
(45) Date of Patent: Nov. 3, 2009

(54) HEADLIGHT ADJUSTMENT DEVICE WITH DUAL INPUT GEAR MECHANISM

(75) Inventors: Daniel J. Flynn, Morphett Vale (AU); Robert Apfelbeck, Hochdorf (DE); Andreas Leittretter, Denkendorf (DE)

(73) Assignee: odelo GmbH, Schwaikheim (DE)

( * ) Notice: Subject to any disclaimer, the term of this patent is extended or adjusted under 35 U.S.C. 154(b) by 277 days.

(21) Appl. No.: 11/780,337

(22) Filed: Jul. 19, 2007

(65) Prior Publication Data
US 2008/0019140 A1    Jan. 24, 2008

(30) Foreign Application Priority Data
Jul. 21, 2006    (DE) .................... 10 2006 034 243

(51) Int. Cl.
*F21V 19/02*    (2006.01)
*F21V 21/15*    (2006.01)

(52) U.S. Cl. .................... 362/524; 362/513; 362/526
(58) Field of Classification Search .................. 362/464, 362/467, 512, 513, 523, 524, 525, 526
See application file for complete search history.

(56) References Cited
FOREIGN PATENT DOCUMENTS
DE    198 02 023 A1    2/1997

*Primary Examiner*—Ismael Negron
(74) *Attorney, Agent, or Firm*—Reising Ethington P.C.

(57) ABSTRACT

A headlight adjustment device with at least two drive units for adjustment of a light module in at least two directions, each drive unit having at least one drive motor and a gear mechanism with two input elements movable relative to each other, which are connected by means of a coupling element. At least one input element of each drive element is coupled to the drive motor of the drive unit. Each coupling element is connected to an output element of the corresponding gear mechanism. In addition, each output element has an adapter for connection to the light modules.

10 Claims, 4 Drawing Sheets

HEADLIGHT ADJUSTMENT DEVICE WITH DUAL INPUT GEAR MECHANISM

The invention concerns a headlight adjustment device with at least two drive units to adjust a light module, each drive unit comprising at least one drive motor, as well as a vehicle headlight with such a headlight adjustment device and with a light module connected to it.

A headlight adjustment device with an inner and an outer pivot device is known from DE 198 02 023 A1. During operation of the outer pivot device the inner pivot device is moved together with its drive unit. The system is sluggish because of the large moving masses. Adjustment of the headlight is only possible by repeated installation and disassembly of the headlight components.

The present invention is therefore based on the problem of developing a headlight adjustment device having high dynamics and permitting simple adjustment of the headlight in at least two directions, A headlight with such a headlight adjustment device and with a light module is also supposed to be developed.

This problem is solved with the features of the main claim. For this purpose each drive unit has a gear mechanism with two input elements movable relative to each other connected by means of a coupling element. At least one input element of each drive unit is coupled to the drive motor of the drive unit. Each coupling element is connected to a drive element of the corresponding gear mechanism. Each drive element also has an adapter for connection to the light module.

Additional details of the invention are apparent from the dependent claims and the following description of schematically depicted variants.

Figure 1:
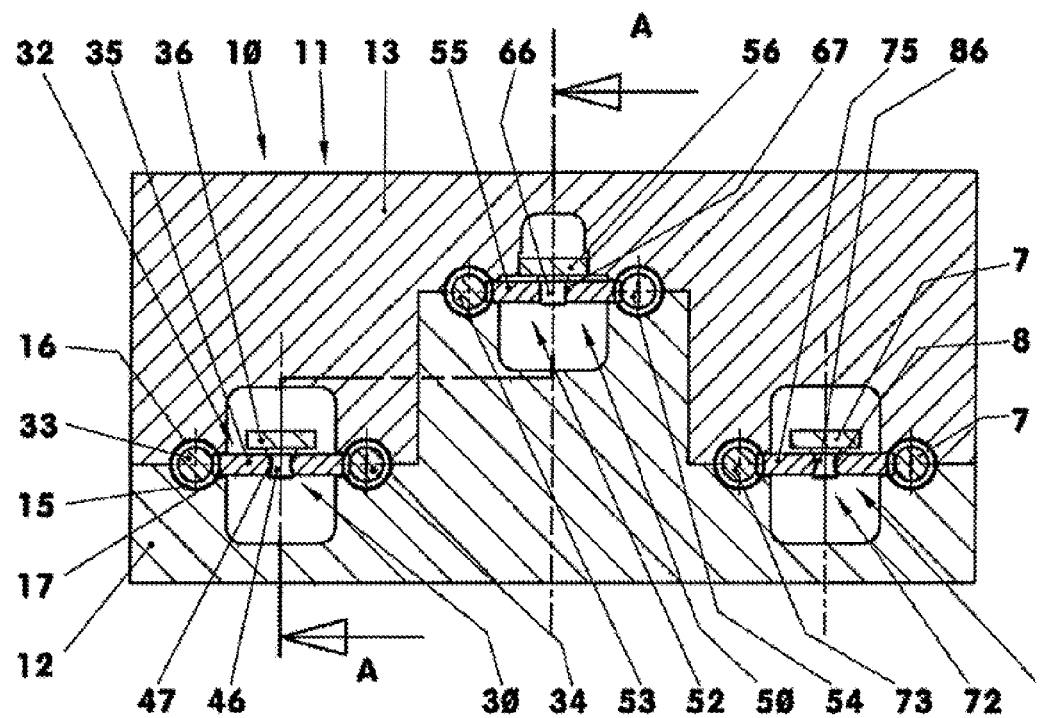
Figure 2:
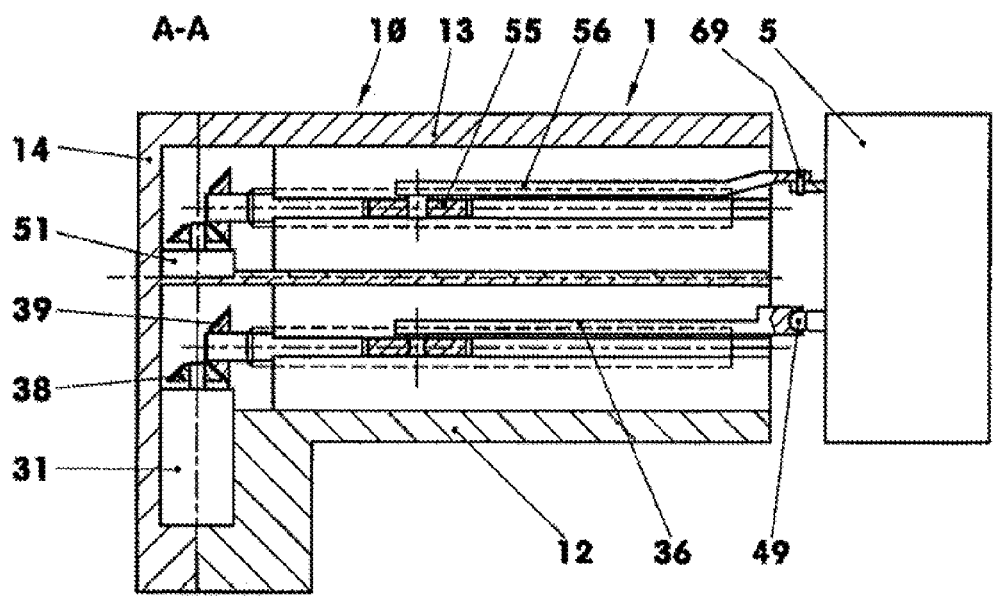
Figure 3:
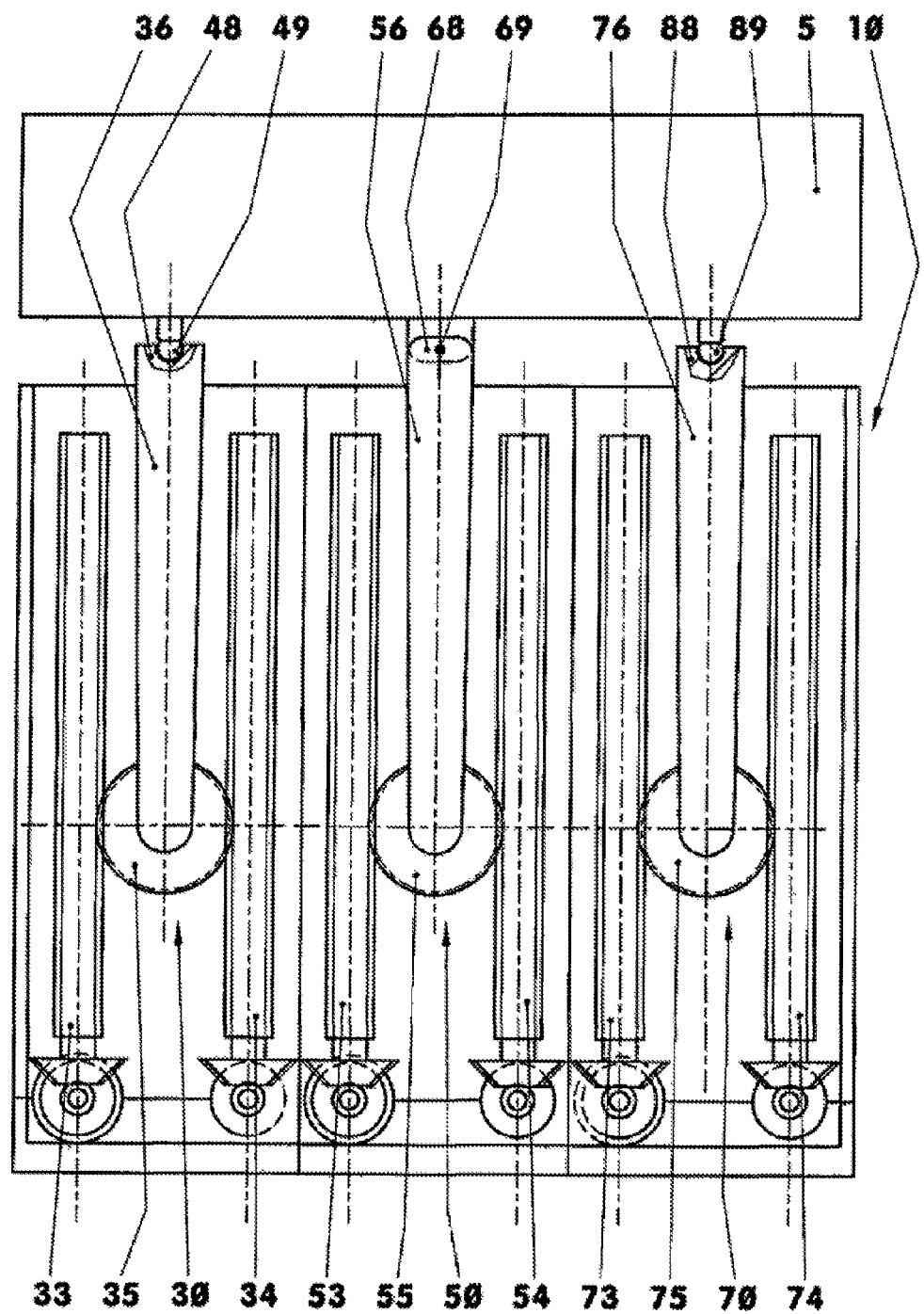
Figure 4:
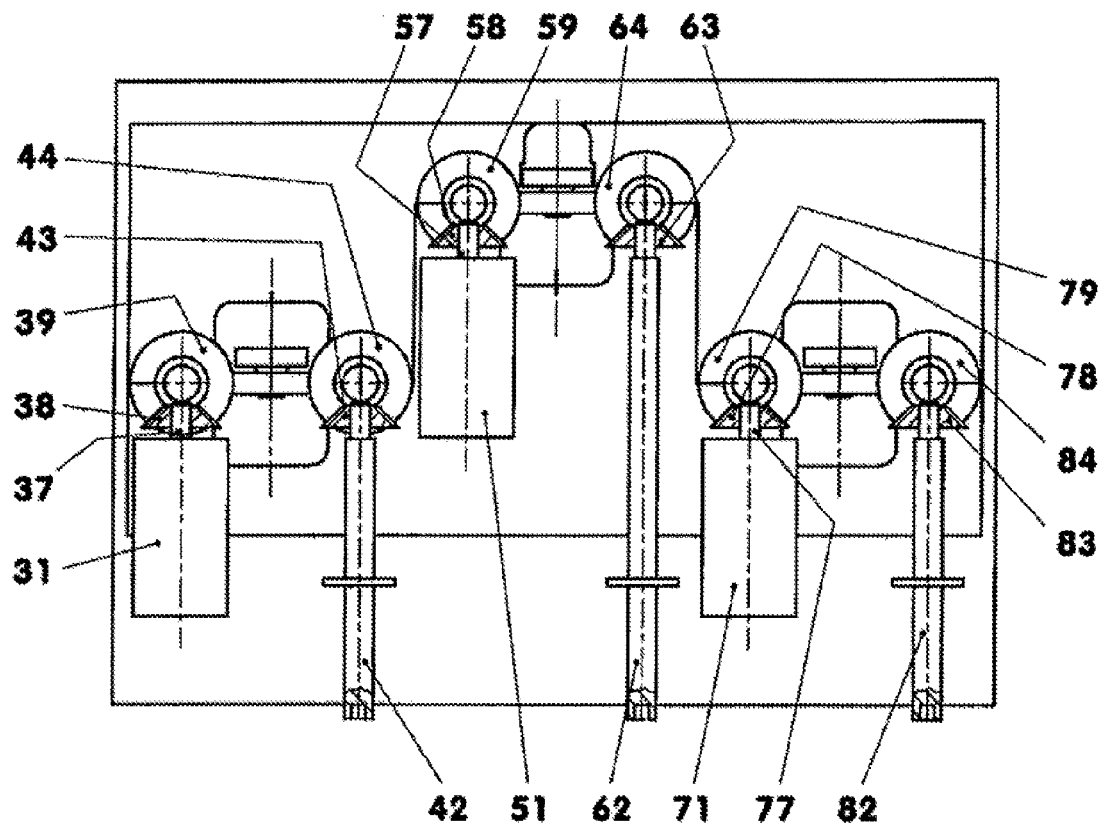
Figure 5:
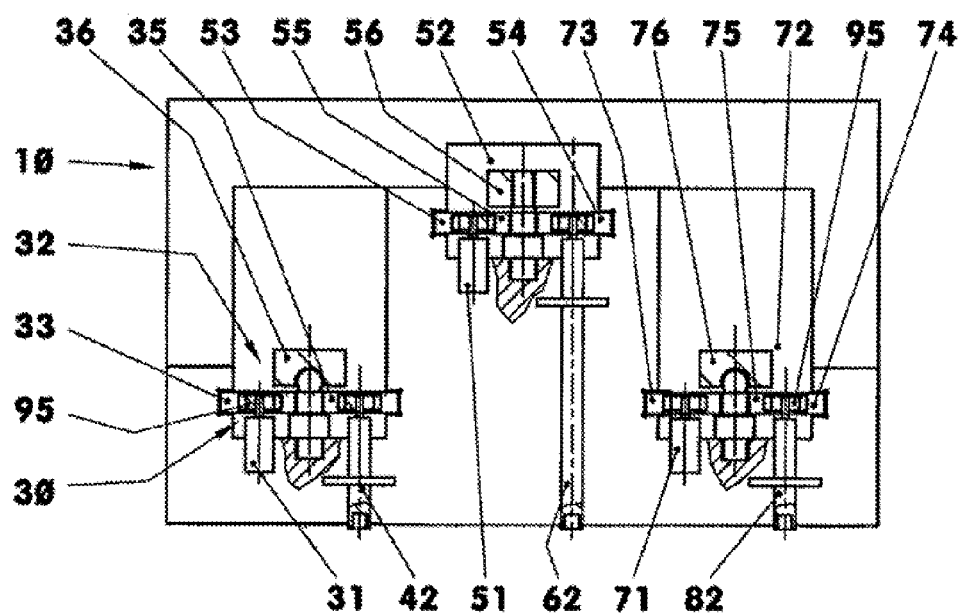
Figure 6:
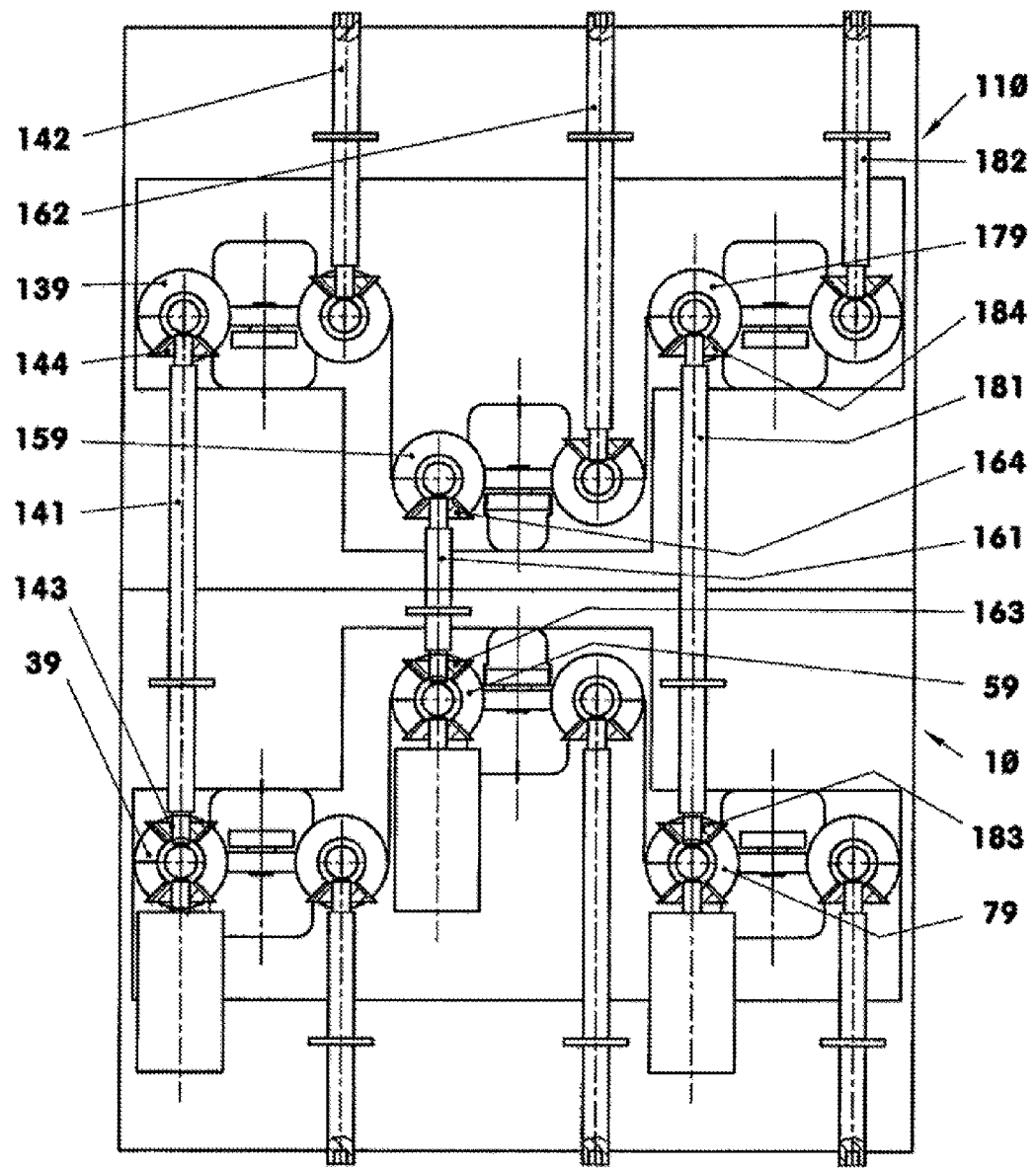

FIG. 1: Cross-section of a headlight adjustment device of a vehicle headlight;

FIG. 2: Section A-A of FIG. 1 with a light module;

FIG. 3: Top view of FIG. 2 with the housing top removed;

FIG. 4: Rear view of FIG. 2 with the cover removed,

FIG. 5: Headlight adjustment device with racks;

FIG. 6: Coupling of two adjustment devices.

FIGS. 1-4 show a vehicle headlight (1) with a headlight adjustment device (10) and a light module (5). The leveling, light slope, angle of illumination and installation of the light module (5) can be adjusted with the headlight adjustment device (10). For this purpose the headlight adjustment device (10) is fastened, for example, in a headlight housing (not shown here). It carries the light module (5), which can optionally also be supported in the headlight housing.

The headlight adjustment device (10) includes a housing (11) in which, for example, three drive units (30, 50, 70) are arranged. The housing (11) includes a bottom (12), a top (13), as well as a cover (14). These components (12-14) are produced, for example, from plastic, metal or a composite. They are screwed to each other, for example, by means of screws not shown here, but can also be connected to each other by snap connections, clip connections, glue joints, etc, in shape-mated and/or force-fit fashion. In addition, components (12-14) can be adjusted relative to each other by shape-mated elements, for example, centering pins.

The three drive units (30, 50, 70) are arranged parallel to each other here. The left (30) and the right drive unit (70) are arranged in the depictions of FIGS. 3 and 4 in the same plane symmetric to the vertical center longitudinal plane of light module (5) and the headlight adjustment device (10). The middle drive unit (50) in these depictions lies symmetric to the vertical center longitudinal plane above the plane of the other two drive units (30, 70). The three drive units (30, 50, 70) can also be arranged, for example, so that the drive units (50) and (70) lie one above the other and the drive unit (30) is arranged in the transverse direction of the vehicle headlight (1) offset relative to it. It is also conceivable to make the headlight adjustment device (10) with only two drive units (30, 70). The headlight adjustment device (10) and the light module (5) are then additionally connected, for example, in a support point.

The three drive units (30, 50, 70) shown here in this practical example each have a drive motor (31, 51, 71), a gear mechanism (32, 52, 72) with two input elements (33, 34; 53, 54; 73, 74), a coupling element (35; 55; 75) and an output element (36; 56; 76). The individual drive motor (31, 51, 71) is, for example, a dc motor with a weight of, for example, 125 grams. Its motor shaft (37; 57; 77) is arranged vertically here and carries a bevel gear (38; 58; 78). This bevel gear (38; 58; 78) meshes with a second bevel gear (39; 59; 79), which sits, for example, on the left input element (33; 53; 73), cf. FIGS. 1, 3 and 4.

The input elements (33, 34; 53, 54; 73, 74) are, e.g., cylindrical worms (33, 34; 53, 54; 73, 74) having straight flanks in longitudinal section, for example. In this practical example they are designed as threaded spindles. This means that a gear rolling off on one worm (33, 34; 53, 54; 73, 74), for example, a worm gear, is offset in the longitudinal direction of the worm (33, 34; 53, 54; 73, 74).

The two worms (33, 34; 53, 54; 73, 74) of a drive unit (30; 50; 70) are designed the same and arranged parallel to each other. The pitches of the worms (33, 34; 53, 54; 73, 74) belonging to one drive unit (30; 50; 70) are directed in the same direction and are identical. The worms (33, 34; 53, 54; 73, 74) belonging to different drive units (30; 50; 70) can have different pitches and/or pitch directions.

In the practical example depicted here, driving of the corresponding right worm (34; 54; 74) occurs, for example, by means of an adjustment shaft (42; 62; 82), which carries a bevel gear (43; 63; 83) on its one end, which engages with a bevel gear (44; 64; 84) on the worm (34; 54; 74). The other end of the adjustment shaft (42; 62; 82) is guided, for example, to the outside of housing (11). There the adjustment shaft (42; 62; 82) and the worm (34; 54; 74) connected to it can be adjusted, for example, by means of a rotating adjustment wrench. The adjustment shaft (42; 62; 82) can be arranged here parallel to the shaft (37; 57; 77) of the drive motor (31; 51; 71). It is mounted, e.g., in the housing (11) by means of a plain bearing.

The worms (33, 34; 53, 54; 73, 74) are each mounted, for example, to slide radially in housing shells (15, 16) and secured axially. The housing shells (15, 16) of the bottom (12) and top (13) enclose the addendum circle surfaces of the worms (33, 34; 53, 54; 73, 74). The kerf between the upper (13) and the lower housing part (12) includes, for example, the horizontal center planes of the gear mechanism (32, 52, 72).

The coupling element (35; 55; 75) is arranged between the worms (33, 34; 53, 54; 73, 74) of a drive unit (30; 50; 70). For example, this is a gear (35; 55; 75), for example, a worm gear, which meshes with the two worms (33, 34; 53, 54; 73, 74). This gear (35; 55; 75) lies in the horizontal center plane of the gear mechanism (32, 52, 72). Tilting or canting of the coupling gear (35; 55; 75) is prevented there, e.g., by gear guide surfaces (17) of the housing (11).

An output element (36, 56, 76) is arranged in each drive unit (30, 50, 70) in this practical example above the coupling gear (35; 55; 75). These are, for example, levers (36, 56, 76), each with a mounting pin (46, 66, 86) on which the corresponding coupling gear (35; 55; 75) is supported. In the practical example depicted here the mounting pins (46; 86) of the lower, two drive units (30; 70) are designed spherical. The coupling gears (35; 75) mounted on these mounting pins (46, 48) have a spherically shaped hole (47; 87). The lever (56) of the upper drive unit (50) in this practical example has a cylindrical mounting pin (66), which sits in a cylindrical hole (67) of the coupling gear (55). The mounting pin (66) of this lever (56) can also be made spherical. The hole play of the spherical (46, 47; 86, 87) and cylindrical guides (66, 67) is smaller than a tenth of a millimeter. The individual coupling gear (35; 55; 75) on the corresponding mounting pin (46; 66; 86) is additionally secured against falling out, e.g., by means of a circlip.

The levers (36; 56; 76) have, for example, an essentially constant cross section and protrude from the housing (11) on the side facing the light module (5). Each lever here (36; 56; 76) carries an adapter (48, 68, 88). The adapters (48, 83) of the two lower levers (36, 76) in this practical example form ball joints (49, 89) with the corresponding mating pieces on the light module (5), which permit three degrees of freedom for rotational pivoting. The adapter (68) of the upper lever (56) in this practical example forms a pivot joint (69) with a mating piece arranged on light module (5) with a vertically arranged pivot axis.

The lever (56) of the upper drive unit (50) is guided, for example, in the housing (11) in the transverse direction, of FIG. 1. The two other levers (36, 76) can be pivoted in the transverse direction, for example, at an angle of ±5 degrees.

During assembly the worms (33, 34; 53, 54; 73, 74) are initially inserted into the lower housing part (12). The guide surfaces (15, 16, 17) can be greased, for example. The bevel gears (39; 59; 79; 44; 64; 84) point toward the back of the housing (11) facing away from light module (5). The levers (36; 56; 76) with the coupling gears (35; 55; 75) are inserted into housing (11) so that the coupling gears (35; 55; 75) lie on the guide surfaces (17) and the adapters (48; 68; 88) protrude from the housing (11) on the side opposite the bevel gears (39; 59; 79; 44; 64; 84).

After mounting of the upper housing part (13), the two housing parts (12, 13) are, for example, screwed together.

The drive motors (31, 51, 71) are now inserted, e.g., into the housing troughs on the side of the housing parts (12, 13) facing away from adapters (48, 68, 88) so that the bevel gears (38; 58; 78) engage in the bevel gears (39; 59; 79) of the worms (33; 53; 73). The electrical connections of the drive motors (31, 51, 71) (not shown here) are combined, for example, in a plug arranged outside the housing (11). In addition, the adjustment shafts (42; 62; 82) are inserted into the housing bottom (12), e.g., so that the bevel gears (43; 63; 83) mesh with the bevel gears (44; 64; 84) and the opposite ends of the adjustment shafts (42; 62; 82) are accessible from the outside of housing (11). The cover (14) is finally mounted on the housing parts (12, 13) and, e.g., screwed to it.

The light module (5), for example, is connected to the adapters (48, 68, 88) of the headlight adjustment device (10) so installed and the entire unit fastened in the headlight housing, for example, by means of a fastening flange arranged on the headlight adjustment device (10).

After assembly of the headlight and/or after installation of the headlight in a vehicle, the headlights are adjusted. For this purpose the drive motors (31, 51, 71), for example, are in a defined zero position, which, for example, is recognized by an absolute path or angle measurement system.

In order to adjust, e.g., the curve light adjustment, the two drive units (30, 70) on the bottom, for example, are manually adjusted. For this purpose the adjustment shaft (82) of the right drive unit (70) is turned, for example, by means of a tool. The adjustment shaft (82) drives the worm (74) via the bevel gear mechanism (83, 84). The rotating worm (74) causes rolling of the coupling gear (75) on this worm (74) and on the fixed worm (73). The worm (73) remains at rest because of self-inhibition of the worm gear pair (73, 75) and friction of worm (73) in the housing (11). The coupling gear (75) rolling on worm (73, 74) pushes the lever (76), for example, in the direction of the side on which the adapters (48; 68; 88) protrude from housing (11). The left drive unit (30) is adjusted during adjustment so that the lever (36) is introduced into the housing (11). The light module (5) is pivoted leftward, for example, until the reference value of the adjustment is reached.

The slope angle and height adjustment of the headlight are adjusted in similar fashion. During adjustment of the slope angle, for example, the two lower drive units (30; 70) are adjusted in the same direction. For height adjustment, for example, to balance out manufacturing tolerances, all three drive units (30; 50; 70) for example, are adjusted. The shafts (42; 62; 82) are optionally locked after adjustment.

During operation of the headlight in the vehicle, e.g., during curved travel the drive motor (71) of the right drive unit (70) is supplied with current. The rotational movement of the motor shaft (77) is transferred via the bevel gear mechanism (78, 79) to the, e.g., left worm (73) of the drive unit (70). This meshes with the coupling gear (75), which rolls on the self-inhibiting fixed right worm (74). The lever (76) is pushed out, for example, with the adapter (88). At the same time, for example, the adapter (48) in the left drive unit (30), driven by drive motor (31), is started. The upper drive unit (50) remains unactivated. The light module (5) pivots leftward, during which, e.g., its pivot axis coincides with the pivot axis of the pivot joint (69). The drive motors (31, 51, 71) remain at rest in this case relative to the headlight housing. The mass moved by the headlight adjustment device (10) (this includes only light module (5)) amounts to 900 grams, for example. The maximum adjustment angle of the light module (5) is, for example, ±15 degrees. The maximum pivot angle on one side can optionally be limited, e.g., to 9.5 degrees.

In order to adjust the slope angle of light module (5) to the loading state of the vehicle, the two lower drive units (30, 70) are adjusted, for example, so that either both adapters (48, 88) are extended or both adapters (48, 88) are retracted. In this case the light module (5) pivots by a maximum of ±4 degrees. The maximum pivot angle on one side can optionally be limited, e.g., to 3 degrees.

During adjustment of the slope angle the lever (36, 76), for example, in the lower drive unit (30, 70) is pivoted relative to coupling gear (35, 75) in a plane normal to the center plane of the gear mechanism (32, 72). The lever (56) in the upper drive unit (50) can include a film joint, e.g., deformed elastically.

During travel of the vehicle, roadway roughness leads to vibrations of the vehicle structure. Self-inhibition of the worm gears (33, 34, 35; 53, 54, 55; 73, 74, 75) pre-vents inadvertent adjustment of the headlight. Rotation of the light module (5) around the longitudinal axis of the headlight adjustment device (10) is also prevented. The headlight adjustment device (10) can additionally be blocked when not in use.

The headlight adjustment device (10) is constructed from only a few components. During adjustment of the light module only limited masses are moved. The headlight adjustment device (10) therefore requires limited starting torque and, because of the small moving masses, can react dynamically to changes in vehicle condition. The drive motors (31, 51, 71) are protected, for example, because of the self-inhibition of the gear mechanism (32, 52, 72) from feedback of the light module (5), for example, from vibrations. Their wear is therefore limited.

For example, if the light module (5) or the headlight adjustment device (10) is to be replaced during repair, the light module (5), e.g., is separated from the headlight adjustment device (10) by loosening the adapters (48, 68, 88). After replacement of the damaged component (5; 10) the two parts (5, 10) are assembled again. The headlight (1) is now readjusted manually and then ready for use again. The pre-adjustment described as manual can also be conducted by means of a motor-driven preadjustment tool.

The shafts (37; 57; 77; 42; 62; 82), worms (33, 34; 53, 54; 73, 74) and coupling gears (35; 55; 75) can also be designed with roller bearings instead of the plain bearings described here. Some bearing locations can also be designed as plain bearings and in other bearing locations as roller bearings.

Transmission of the drive torque to the worms (33; 34; 53; 54; 73; 74) can also occur by means of a screw drive, straight or helical spur gears, etc. instead of by means of the bevel gear pairs (38, 39; 43, 44; 58, 59; 63, 64; 78, 79; 83, 84). The worms (33; 34; 53; 54; 73; 74) can also be directly connected to the drive motors (31, 51, 71) and/or to the adjustment shafts (42, 62, 82).

FIG. 5 shows a cross section of a headlight adjustment device (10) whose gear mechanisms (32, 52, 72) include racks (33, 34; 53, 54; 73, 74) as input elements. These racks (33, 34; 53, 54; 73, 74) are mounted to be moved easily, for example, in the longitudinal direction of the headlight adjustment device (10). The left rack (33, 53, 73), e.g., of each of the three drive units (30, 50, 70) is driven, for example, by means of a drive motor (31, 51, 71) and a pinion (95). The respective right rack (34, 54, 74) is then adjustable, for example, manually by means of an adjustment shaft (42; 62; 82) and a pinion (95). The coupling elements (35, 55, 75) and the output elements (36, 56, 76) are designed similarly to that described with reference to the practical examples shown in FIGS. 1 to 4. The pinions (95), racks (33, 34; 53, 54; 73, 74) and the coupling gears (35, 55, 75) can be straight or helical.

In order to prevent unintended adjustment of the headlight adjustment device (10), the drive units (30, 50, 70) can also be blocked after adjustment. As an alternative to this, the pinions (95), for example, can have a self-inhibiting gear stage connected in front, for example, in the form of a worm gear drive, a screw drive, etc.

It is also conceivable to design the gear mechanisms (32, 52, 72) as coupling gears with two rigidly linked input elements (33, 34; 53, 54; 73, 74), a rigid coupling element (35, 55, 75) joined to it and an output element (36, 56, 76).

The gear mechanisms (32, 52, 72) can also be designed as gear drives. In this variant a drive pinion drives the coupling gear (35, 55, 75). The lever (36, 56, 76) on the coupling gear (35, 55, 75) is fastened as an output element. The position of the mounting pin (46, 66, 86) relative to coupling gear (35, 55, 75) is pre-adjustable, for example, by means of an eccentric. For fine adjustment the drive pinion is then operated. A self-inhibiting gear mechanism, for example, can also be connected in front of this gear mechanism (32, 52, 72).

Combinations of the practical examples just described are also conceivable. The individual drive units (30, 50, 70) of a headlight adjustment device (10) can be designed differently.

FIG. 6 shows two headlight adjustment devices (10; 110) coupled to each other with the covers removed. The headlight adjustment device (10) arranged, e.g., on the bottom here is connected, for example, to a light module for the low beam. It is essentially constructed as described in conjunction with FIGS. 1 to 4. The second headlight adjustment device (110) arranged on the top in FIG. 6 is connected, for example, to a high beam module. The manually operable adjustment shafts (142, 162, 182) are directed upward here. The headlight adjustment device (110) in this practical example has no drive motors. Coupling shafts (141, 161, 181) are arranged between the bevel gears (39, 139; 59, 159; 79, 179). These coupling shafts (141, 161, 181) each carry a bevel gear (143, 144; 163, 164; 183, 184) on both ends, which mesh with the bevel gears (39, 139; 59, 159; 79, 179).

For example, during installation in the vehicle the individual light module is manually pre-adjusted by means of the corresponding headlight adjustment device (10; 110), for example, with reference to height. During operation the light modules are adjusted jointly by means of the drive motors (31, 51, 71).

It is also conceivable that the headlight adjustment device (110) has one or two drive motors. This headlight adjustment device (110) is then only connected to two or one coupling shaft with the lower headlight adjustment device (10). It is possible because of this, e.g., to connect only individual movements of the low beam and high beam module to each other. Optionally, the light module (110) can have drive motors instead of adjustment shafts (142, 162, 182). The coupling shafts (141, 161, 181) can also have couplings or transmission gears.

LIST OF REFERENCE NUMBERS

1 Vehicle headlight
5 Lights module
10 Headlight adjustment device
11 Housing
12 Bottom
13 Top
14 Cover
15, 16 Housing shells, guide surfaces
17 Gear guide surfaces
30, 50, 70 Drive units
31, 51, 71 Drive motor
32, 52, 72 Gears
33, 53, 73 Input elements, worms, threaded spindles, racks
34, 54, 74 Input elements, worms, threaded spindles, racks
35; 55; 75 Coupling elements, coupling gears, gears
36; 56; 76, Output elements, levers
37; 57; 77 Engine shaft
38; 58; 78 Bevel gear
39; 59; 79 Bevel gear
42; 62; 82 Adjustment shaft
43; 63; 83 Bevel gear
44; 64; 84 Bevel gear
46, 66, 86 Mounting pin
47, 67, 87 Hole
48, 68, 88 Adapter
49, 89 Ball joints
69 Pivot joint
95 Pinion
110 Headlight adjustment device
139, 159, 179 Bevel gears
141, 161, 181 Coupling shafts
142, 162, 182 Adjustment shafts
143, 163, 183 Bevel gears
144, 164, 184 Bevel gears

The invention claimed is:

1. Headlight adjustment device comprising:
at least two drive units for adjustment of a light module, each drive unit having:
at least one drive motor;

a gear mechanism with first and second input elements movable relative to each other, which are connected to each other by means of a coupling element;

at least one of the first and second input elements of each drive unit is coupled to the drive motor of the drive unit;

each coupling element is connected to an output element of the corresponding gear mechanism; and each output element has an adapter for connection to the light module.

2. Headlight adjustment device according to claim 1, further comprising a third drive unit having:

a drive motor;

a gear mechanism with first and second input elements movable relative to each other, which are connected to each other by means of coupling element;

at least one of the first and second input elements of this drive unit being coupled to the drive motor of drive unit;

the coupling element is connected to an output element;

the output element has an adapter for connection to the light module.

3. Headlight adjustment device according to claim 1 or 2, wherein each second input element is manually adjustable.

4. Headlight adjustment device according to claim 1 or 2, wherein the input elements of the gear mechanisms are worms gears.

5. Headlight adjustment device according to claim 4, wherein the drive motors and the worms gears are each coupled by means of a bevel gear pair.

6. Headlight adjustment device according to claim 4, wherein the worm gears are guided in a housing of the headlight adjustment device.

7. Headlight adjustment device according to claim 6, wherein the gears coupling elements are guided in the housing parallel to a plane spanned by the corresponding worms gears.

8. Headlight adjustment device according to claim 7, wherein the coupling elements on the output element are mounted to rotate around their axes and that at least one coupling elements is mounted to pivot normal to it.

9. Vehicle headlight with at least one headlight adjustment device and with at least one light module connected to it, the headlight adjustment device comprising:

at least two drive units each with at least one drive motor, each drive unit includes:

a gear mechanism with two input elements movable relative to each other, which are connected to each other by means of a coupling element; wherein at least one input element of each drive unit is coupled to the drive motor of the drive unit each coupling element is connected to an output element of the corresponding gear mechanism; and each output element has an adapter for connection to the light module.

10. Vehicle headlight according to claim 9, wherein at least one motor-drive input element of the headlight adjustment device is coupled by means of a coupling shaft to an input shaft of an additional headlight adjustment device.

* * * * *